United States Patent [19]

Rudolf et al.

[11] Patent Number: 4,479,262

[45] Date of Patent: Oct. 23, 1984

[54] STATIC AUDIO-FREQUENCY CONTROL RECEIVER

[75] Inventors: Ulrich Rudolf, Thalwil; Martin Vetter, Oberageri, both of Switzerland

[73] Assignee: Landis & Gyr Aug AG, Zug, Switzerland

[21] Appl. No.: 358,725

[22] Filed: Mar. 16, 1982

Related U.S. Application Data

[63] Continuation of Ser. No. 53,322, Jun. 29, 1979, abandoned.

[30] Foreign Application Priority Data

Jun. 30, 1978 [CH] Switzerland .................. 7152/78

[51] Int. Cl.³ .................. H04B 1/06; G01R 21/00
[52] U.S. Cl. .................. 455/352; 455/230; 340/825.22
[58] Field of Search .......... 455/352, 353, 227, 229, 455/230, 231, 140, 141, 144, 151; 340/147 A, 147 F, 147 G, 147 P, 150, 151, 157

[56] References Cited

U.S. PATENT DOCUMENTS

| | | | |
|---|---|---|---|
| 3,900,880 | 8/1975 | Fleischer | 455/353 |
| 3,944,925 | 3/1976 | Augenblick et al. | 455/229 |
| 4,002,984 | 1/1977 | Streckenback | 455/352 |

FOREIGN PATENT DOCUMENTS 2613112 9/1977 Fed. Rep. of Germany .
1524794 9/1978 United Kingdom .

*Primary Examiner*—Tommy P. Chin
*Attorney, Agent, or Firm*—Morgan, Finnegan, Pine, Foley & Lee

[57] ABSTRACT

Static audio-frequency control receiver for the time impulse interval process, consisting of a micro-computer, an electronic computing means and an evaluation component. In the micro-computer, a number of impulse scanning patterns are stored, and a programming field is formed for the selection of the impulse scanning pattern governing at the installation location. The programming field consists of a crossbar distribution panel with junctions from the outputs of the micro-computer with three inputs per command execution relay. The inputs for each of the relays have further connections for programming impulse scanning patterns. The micro-computer produces a series of rapid impulses upon connection, and performs a self-activating operation tests. The impulse scanning patterns cause connections to be made in the arithmetic unit for the production of impulse sequences in real time to the audio-frequency control command - impulse sequences. The micro-computer also has a synchronizing input. The direct current power can be shut off through suppression of connection signals at the output of the micro-computer. The micro-computer is reset when two impulses occur in related double step. A store circuit shuts down all relays after a system voltage interruption.

11 Claims, 3 Drawing Figures

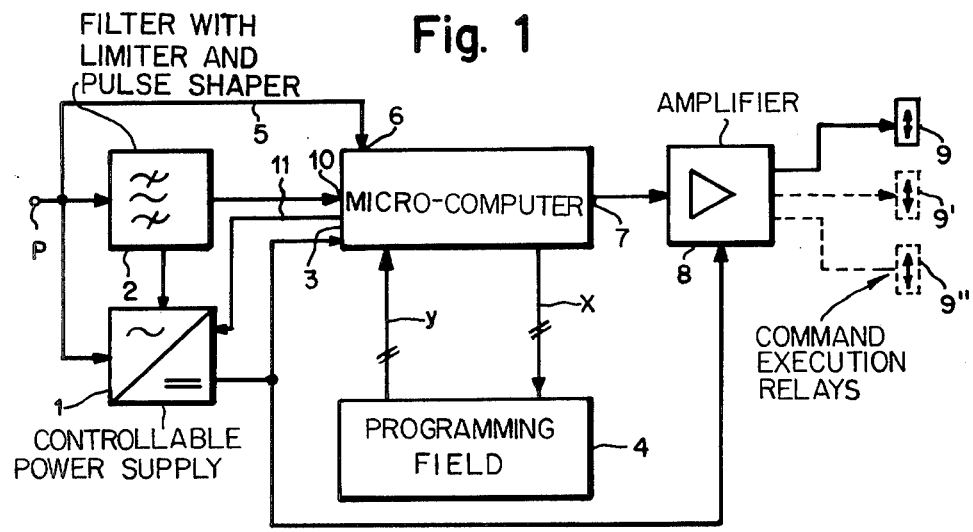
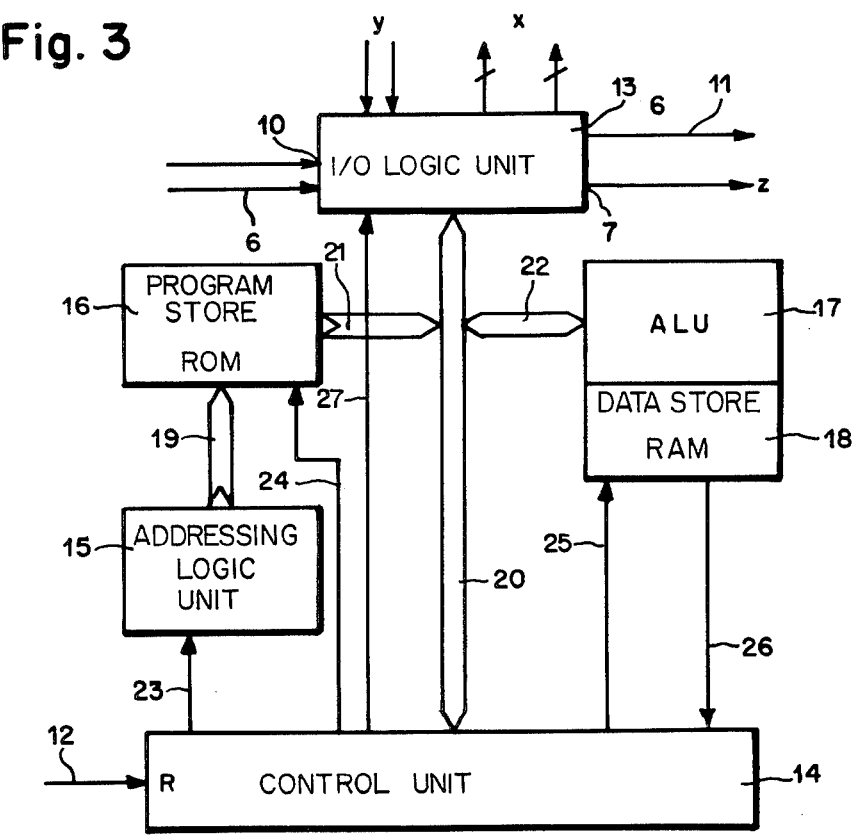

STATIC AUDIO-FREQUENCY CONTROL RECEIVER

CROSS-REFERENCE TO RELATED APPLICATION

This is a continuation of application Ser. No. 053,322, filed June 29, 1979, now abandoned.

BACKGROUND

The invention is directed to the field of static audio-frequency control receivers.

Audio-frequency control units serve the purpose of transmitting switch commands to all consumption points in a system, either to connect or disconnect consumption units or for other control switches in the system. In such systems, audio-frequency impulses are fed into the system for this purpose and the consumption units have receivers which respond to predetermined commands, and which carry our the provided switch operations. Among the various known audio-frequency control systems, the most common are based on the time-interval process. In such systems, a sequence of command impulses is associated with a start impulse on the time axis. Various manufacturers of differing audio-frequency control systems generally use impulse sequences which differ from one another in several respects.

Modern static receivers which evaluate such command impulse sequences preferably consist of, plug-in components, including a filter for the selection of the desired audio-frequency impulses, at least one electronic channel set, an adjustable decoding device, command relays and a system component for the supply of the receivers. By means of the decoding device, the audio-frequency control receiver can be adjusted for the evaluation of a certain command impulse sequence. This adjustment can be made in various ways.

Several generations of such static audio-frequency control receivers are known, and which vary largely through the degree of integration. One prior art patent proposes the use of a micro-computer with a suggested customized method for calculation and evaluation of the switch commands (German Pat. No. DE-OS 26 13 112).

One object of applicant's invention is to disclose an audio-frequency control receiver with particularly high flexibility, which instead of being designed for a particular audio-frequency pulse code can be used in various pre-existing or newly-created audio-frequency control systems, with low manufacturing costs, and which also permits sure execution of the audio-frequency control commands.

BRIEF DESCRIPTION OF THE DRAWINGS

FIG. 1 shows the block schematic of a static audio-frequency control receiver.

FIG. 3 shows a block schematic of a micro-computer used as part of said receiver.

DETAILED DESCRIPTION OF THE INVENTION

Figure 2:
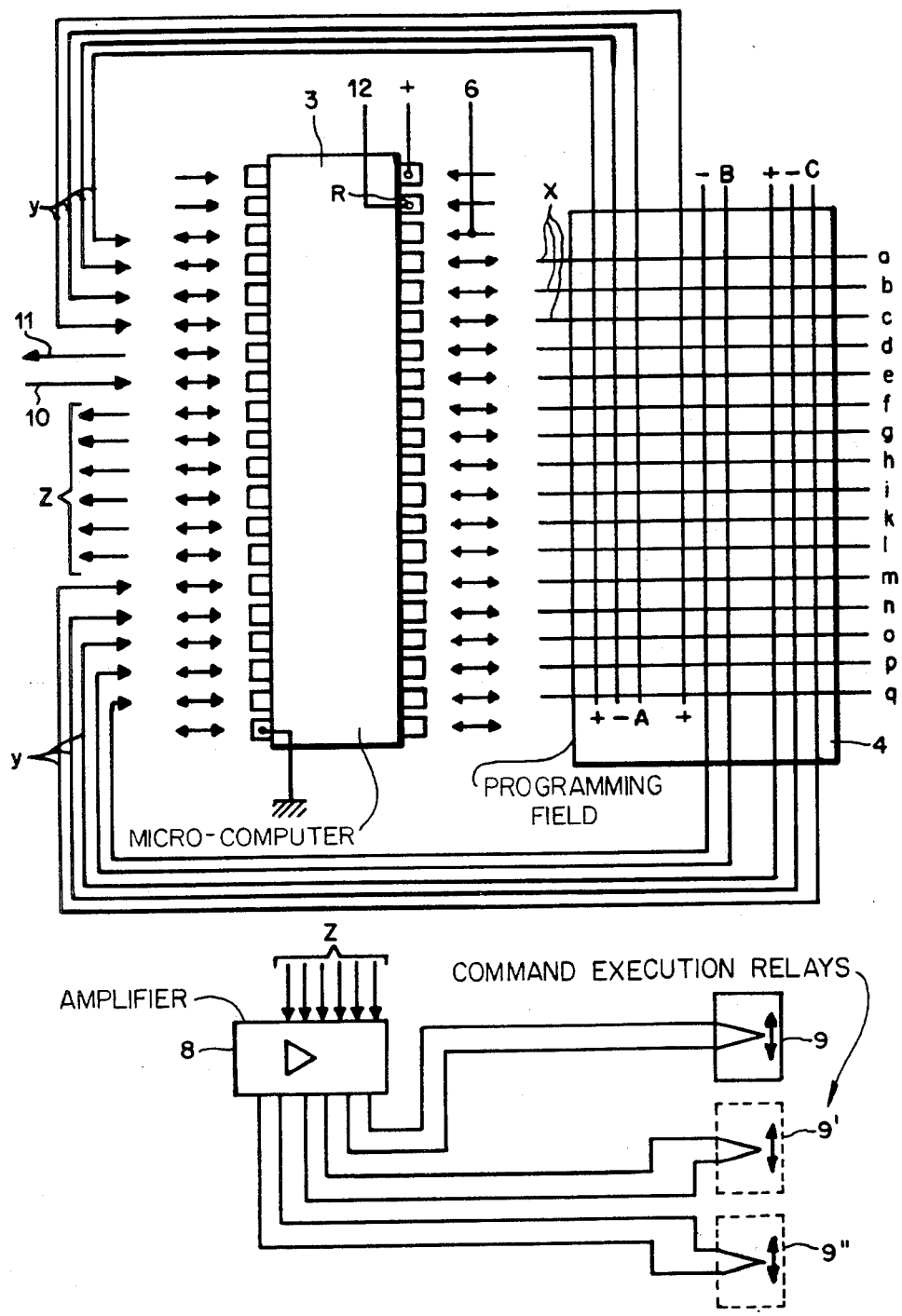
FIG. 2 shows a partial schematic of said receiver.

In FIG. 1, P indicates a connection to a system line. This is preferably connected, to filter 2, containing a limiter and a pulse shaper (not shown), and, also connected to a controllable power supply 1. One output of Filter 2 is connected to an input 10 of a single-chip micro-computer 3. Micro-computer 3 is connected by means of x outputs and y inputs to programming field 4, which is a programming device for micro-computer 3. An additional output of filter 2 forms a control input for power supply 1. Also, from connection P, a line 5 connects to a synchronizing input 6. The command output 7 of the micro-computer 3 is connected to an amplifier 8 (if necessary, multi-channeled), which controls either a command execution relay 9 (indicated by unbroken lines) or command execution relays 9' and 9", (indicated by broken lines). An output 11 of micro-computer 3 forms an additional control input for power supply 1.

Micro-computer 3 can be a micro-computer set up for the parallel processing of 4 bits. Since such a computer has relatively few outputs, a multiplexer should be subsequently connected thereto, by means of which significantly more outputs can be acquired. The micro-computer 3 can also be a type set up for the processing of 8 bits, illustratively of the MK 3870 type.

FIG. 2 shows micro-computer 3, programming field 4, amplifier 8 and relays 9, 9' and 9" of the audio-frequency control receiver in more detail. The outputs of the output logic unit of micro-computer 3 are connected with a first plurality of busbars a through q of programming field 4, which are components of a crossbar distribution panel. A second plurality of busbars arranged vertically to said first plurality of busbars of this distribution panel form the y outputs of programming field 4, which are connected with the corresponding inputs of micro-computer 3. For each command execution relay 9, 9', 9" present in the audio-frequency control receiver, three such lines and inputs y are provided, which are designated with the symbols "+" or "−" combined with a capital letter "A", "B" or "C". The crossbar distribution panel operates in usual fashion wherein, for example, diodes are used in interconnect at selected horizontal and vertical intersections.

FIG. 3 shows a block schematic of micro-computer 3, which is composed of an input and output logic unit 13, a control unit with pulse generator 14, an addressing logic unit 15, a program store (ROM) 16, an arithmetic logic unit (ALU) 17 with a data store (RAM) 18 and several data lines: address bus 19, data busses 20, 21, and 22. Furthermore, various control lines are present: an initial control line 23 leading from the control unit 14 to the addressing logic unit 15; a second control line 24 leading from control unit 4 to the program store 16, a third control and address line 25 leading from control unit 14 to data store 17, a fourth control line 26 leading in the reverse direction and a fifth control line 27 leading from control unit 14 to the input and output logic unit 13. The transfer direction is indicated on each bus 20, 21 and 22, and on each control line 23 through 27 with arrows.

The audio-frequency control receiver in FIGS. 1 through 3 operates as follows:

The power-supply unit 1 is continuously connected to Connection P of the system line. It continuously provides direct current to amplifier 8. Upon either the connection of the audio-frequency control receiver to the system line, the return of the system voltage after an interruption, or upon the occurence of each impulse of a predetermined length at the output of filter 2, the power supply is connected to micro-computer 3 for a certain period of time. This period is determined by a timing circuit contained in power supply 1. When, shortly after the end of this period, no further signal is present from filter 2 or output 11 of micro-computer 3, the power supply cuts out. Through this procedure the energy consumption of the autio-frequency control receiver is reduced, and, blocking during a cycle of the normal message through disturbing impulses is avoided. Furthermore, the feared permanent blocking of micro-computer 3 through "looping" is effectively eliminated in this manner. The disturbance mentioned can be caused by certain disturbing impulses through which the programming of micro-computer 3 gives rise to continually-repeated similar cycles.

The connection of the d.c. power supply to micro-computer 3 can be controlled before the end of the above-mentioned period through impulses arising periodically at the output 11 of micro-computer 3 by these impulses, which will be explained later in more detail. Further opportunities to control the connection of the direct current to micro-computer 3 through impulses to its output 11, or their suppression, are indicated in the following description.

The micro-computer 3 has the ability to determine a particular impulse scanning pattern, i.e. the governing impulses and impulse intervals in the audio-frequency control systems in which the audio-frequency control receiver is to be used, as well as their duration and spacing. For this purpose, the impulse scanning patterns provided for future additional development and used in known audio-frequency control systems are stored in program store 16 of micro-computer 3.

The impulse generator in micro-computer 3 built into the control unit 14 (see FIG. 3) produces timing impulses important to the operation of the micro-computer, which are divided by a scaler (not shown). With each connection of the supply current of micro-computer 3, the impulse scanning pattern specific to the audio-frequency control system in question is read into data store 18 of micro-computer 3. This transfer of data is accomplished by first starting the power supply 1 and the impulse generator 14, which is preferably synchronized with the frequency of the system voltage present at input 6 of micro-computer 3. This results in a rapid impulse sequence (rapid compared to the audio-frequency control program) being transferred through a start-up program (stored in program store 16) to the x outputs of micro-computer 3, which are connected with the upright busbars a through q of programming field 4. The corresponding code for the impulse scanning pattern is programmed in this programming field 4, through connection of the vertical busbar A with upright busbars a through q by means of diodes.

The impulses transmitted over the inputs y of at least two and preferably three of the first busbars of programming field 4 (see FIG. 2) in micro-computer 3 cause the call-up, through addressing logic unit 13 of the impulse scanning pattern appropriate for these impulses. This pattern is called up from program store 16 and transferred into data store 18 (see FIG. 3). There it is stored to control the further operation of the audio-frequency control receiver until either the supply current is interrupted or until a new impulse scanning pattern is read into programming field 4. In most cases, the audio-frequency control receiver concerned will remain in the same system. However, in case of a later conversion to another and more modern or faster system, it spends its entire useful life in a completely ready condition in programming field 4 due to suitable design. This flexibility is likewise of importance when such a receiver is to be used as a test or control receiver, whereby via an additional device or plug-in unit, a term of all impulse sequences arising in each system can be tested.

Thus, the impulse scanning patterns of other systems, in which the start impulses are of the same or different length from the subsequent impulses, and whereby the impulse sequences have different lengths, can be selected by programming field 4.

In order to be able to rapidly customize the number of receivers, it is advantageous to arrange the diodes, which make up the connection between the vertical busbars of programming field 4, in the form of a multiple-row, plug-in "comb" corresponding to the desired program.

In order to be able to evaluate the impulse sequence associated with the receiver, the audio-frequency control signals taken from connection P of the system line are filtered in a known manner in filter 2 (see FIG. 1) with the assistance of the impulse scanning pattern transferred into the data store 18, and then converted into square-wave impulses in the impulse shaper of filter 2. In order to avoid overloading either filter 2 or the following electronic components of the audio-frequency control receiver, a limiter is preferably likewise installed in Filter 2. When each initial impulse of a coherent impulse sequence, which is to be identical to the start impulse, occurs, the supply current for micro-computer 3 is switched on for the previously-described duration over the connection between filter 2 and power supply 1 through the initial leading edge of the impulse. If the impulse duration exceeds this minimum length, micro-computer 3 is activated by the impulse transmitted periodically to output 11, to maintain power supply 1 in the active state. After this, micro-computer 3 can evaluate the impulses coming from filter 2 for command execution.

In order to produce the system-specific impulse scanning pattern which is stored in data source 18 of micro-compuer 3 according to FIG. 3, upon receipt of an audio-frequency command impulse sequence, connections in arithmetic logic unit 17 are activated in micro-computer 3 through the contents of the related cells of data store 18 associated with the relevant impulse scanning pattern. This trips continuing impulses for the corresponding impulse scanning pattern at real speed of the expected command message in control unit 14, as soon as a signal is received at input 7 of micro-computer 3. In the event that both the test of the start impulse for maximum and minimum length, and the test of the following start impulse interval yield positive result i.e., the impulses from filter 2 are found to be in agreement with the impulse stored by the logic unit of the arithmetic unit 17 of micro-computer 3 then, all impulses following this impulse scanning pattern at the provided distance are transferred through outputs x of micro-computer 3 to the corresponding busbars a through q of programming field 4. During this period, a signal to connect the direct current is produced periodically before the end of the period determined by the timing circuit in power supply 1.

Also, the impulse sequences within a certain impulse scanning pattern can be determined via the diodes of programming field 4 of FIG. 2. The diodes to be used for customizing the specific impulse sequences can be arranged likewise in comb-like ridges, when a larger number of audio-frequency control receivers are to be used for the same impulse sequence.

The system and pattern specific impulse sequences can be composed of one or more addresses and/or command steps. The commands can be expressed if necessary, through the address alone ("impulse image"), or through single or double commands in the form of an impulse or an impulse interval. Furthermore, the related double commands "ON" and "OFF" can be placed in direct sequential command steps, or with another ordinal index.

In a known manner, the impulse steps not provided for monitoring can be left out of consideration through omitting the required diodes, and thus leaving them open. In this manner, it is possible to form group commands from groups of individual commands, through which, by means of the same address or by means of the same individual commands, several commands intended to work together can be executed together. This can be of great use particularly in the case of a load decrease or in the case of commands which are dependent on each other (e.g., low tariff off, store heating off). Note should here be made of the fact that the vertical busbars A serve several purposes, namely the selection of the system-specific impulse scanning pattern and the pattern-specific impulse sequence.

In a similar manner, impulse sequences of many different systems can be programmed in programming field 4. For example, each command in another system can be determined directly by means of a diode connection of A with a selection of busbars a through q. In certain systems, the impulses are produced by data store 18 in connection with programming field 4 and the impulse generator in such manner that a continuous sequencing without intervals between them is made possible.

The impulses to the lines y connection with lines x are again led to micro-computer 3 and there, the audio-frequency control impulses received from filter 2 are compared with the impulse sequences to lines y. In the event that both agree, at the end of an expected impulse sequence for the relevant audio-frequency control receivers, a signal will appear at one of the outputs z, which is amplified by amplifier 8, and controls one of the relays 9, 9' or 9".

Micro-computer 3 is set up in such manner that it becomes inactive or is reset when an incorrect impulse or an incorrect impulse interval occurs in one of the programmed impulse sequences for the output of command execution signals z to amplifier 8. A micro-computer 3 is also reset after the return of the supply voltage to connection P in the event of a current interruption in the power line. Micro-compuer 3 can also be customized through designing program field 4 in such manner that resetting takes place directly after either the last command provided for the relevant receiver, or a short command program of a few impulse steps, is executed. Through this a rapid run and corresponding command execution is guaranteed, particularly if only one single command with high priority is provided in the first place of the command execution steps after the start step. This is particularly noticeable with short impulse sequences with short impulses and short intervals between them. In such a case, a high degree of security can be attained even with one address and only one single/double command. Resetting of micro-computer 3, and with this, suppression of the connection of the power supply from power supply 1 can also be provided through a paralysis circuit in micro-computer 3, if two impulses occur in a double step intended for an "ON" and "OFF" command which work together.

Micro-computer 3 can also be set up in such a manner that it is activated during the run of a command impulse sequence through a newly-input start impulse for a command impulse sequence following this. Through this, if necessary, a priority command impulse sequence or a special command, such as, for example, a general load decrease, can be carried out without delay. This is done only in systems with a start impulse extended in relation to the command impulses, and only if a corresponding program has not been stored in advance in program store 16 of FIG. 3, or when it has not been transferred into data store 18.

Furthermore, a storage circuit can be provided in micro-computer 3 through which, after a drop in the system voltage through the micro-computer at the end of a predetermined period, all available relays 9, 9' and 9" are disconnected, by means of which after the return of the system voltage after an interruption, all relays 9, 9' and 9" are first disconnected once. This can be a special advantage in systems which are charged with space heating until just up to their capacity limits, whereby after a longer voltage drop, the re-connection of the system is thus made more difficult or even impossible for all connected heating adjustments show a simultaneous maximum recovery need for heat load.

Finally, for purposes of checking of operational readiness and the correct operation of micro-computer 3, a test program is also stored in its program store 16, through which micro-computer 3 periodically tests operations at times when no audio-frequency control transmissions are expected, for example, subsequent to a command transfer. The connection signals for the power supply of power supply 1 fail to come to its output 11 in cases of failure after the test. Through this, the audio-frequency control receiver is blocked for further runs, which is indicated through a corresponding indication.

We claim:

1. An audio-frequency control receiver programmable for use at a specific receiver location to receive incoming audio-frequency impulse patterns to select impulse patterns having the correct pattern for the specific receiver location comprising:

a micro-computer including a read only memory (ROM) having stored therein a plurality of predetermined impulse scanning patterns;

a filter circuit for receiving, and passing through, the incoming audio frequency impulse patterns;

said micro-computer being connected to said filter for comparing the incoming audio-frequency impulse patterns with a selected one of said predetermined impulse scanning patterns stored in said read only memory to determine whether any of the incoming audio-frequency impulse patterns match said selected predetermined impulse scanning pattern;

a programmable programming field connected to said micro-computer to select said selected predetermined impulse scanning pattern to be used at the specific receiver location for said comparing, and to specify a pattern-specific impulse sequence for comparison by said micro-computer with command control impulse sequences included within an incoming audio-frequency impulse pattern matching said selected predetermined impulse scanning pattern for the specific receiver location; and an output circuit connected to said micro-computer activatable in response to a match between said patern-specific impulse sequence and one of said command control impulse sequences included within said incoming audio-frequency impulse pattern matching said selected predetermined impulse scanning pattern for the specific receiver location.

2. An audio-frequency control receiver according to claim 1 further comprising command execution relays activatable by said output circuit and wherein said programming field consists of a crossbar distribution panel containing connections of each of said micro-computer outputs to at least two inputs to said programming field for each of at least one command execution relay.

3. An audio-frequency control receiver according to claim 1 wherein said micro-computer further includes a random access memory (RAM) and an electronic computing means for the production of a rapid impulse series for transferring said selected impulse scanning pattern from said read only memory to said random access memory.

4. An audio-frequency control receiver according to claim 3 wherein said filter circuit includes limiter and pulse shaping circuits, wherein said micro-computer includes logic circuits and an arithmetic unit, wherein connections are produced in said logic circuits and said arithmetic unit by means of said selected impulse scanning pattern and wherein said transfer of said selected impulse scanning pattern is triggered by the leading edge of the output signal generated by said limiter and pulse shaping circuits of said filter circuit.

5. An audio-frequency control receiver of claim 4 wherein said output signal of said limiter and pulse shaping circuits is generated during each impulse of the specific impulse sequence of a recognized coherent audio-frequency series.

6. An audio-frequency control receiver according to claim 1 further comprising a power supply unit, and a timing circuit for controlling operation of said power supply unit in supplying power to said micro-computer, said power supply unit being shut off after a predetermined period by said timing circuit, said power supplied to said micro-computer being normally off.

7. An audio-frequency control receiver according to claim 6 wherein said micro-computer further includes circuit means through which current from said power supply unit for said micro-computer can be periodically transmitted through to said output shortly before the end of the period predetermined by said timing circuit.

8. In an audio-frequency control system, a receiver comprising:
   a micro-computer;
   a controllable power supply circuit providing power for said micro-computer, said power provided to said micro-computer being normally off;
   a filter for receiving incoming signals consisting of a sequence of pulses at a predetermined audio-frequency, output signals of said filter being coupled to said micro-computer;
   a first storage medium for storing a plurality of predetermined impulse scanning patterns for use in said micro-computer, said micro-computer being operative to compare said output signals with a selected one of said predetermined impulse scanning patterns stored in said first storage medium to determine whether any of said incoming signals have a pattern matching said selected predetermined impulse scanning pattern;
   a second storage medium connected to said micro-computer and said first storage medium for
   selecting said selected predetermined impulse scanning pattern; and
   specifically a pattern-specific impulse sequence used by said micro-computer to detect control commands included within said incoming signals when received in accordance with said selected predetermined impulse scanning pattern, and wherein
   said controllable power supply circuit being activated by said incoming signals to provide said power for said computer.

9. A receiver according to claim 8 wherein said first storage medium is a ROM, and wherein said second storge medium is a programming field comprised of an array of row and column conductors.

10. A receiver according to claim 8 wherein said micro-computer is operative only when said controllable power supply circuit is activated and wherein said controllable power supply circuit includes a timer for deactivating said controllable power supply circuit after a predetermined interval of time.

11. In an audio-frequency control system, a receiver for the transmission of commands to a receiver station, comprising:
   a micro-computer;
   means for receiving incoming audio-frequency signals connected to said micro-computer;
   a controllable power supply for supplying power to said micro-computer upon receipt of an incoming audio-frequency signal of a predetermined length for a predetermined period of time, said controllable power supply including a resettable timer connected to said micro-computer for terminating said supply of power to said micro-computer after termination by said micro-computer of a reset signal from said micro-computer upon completion of processing of said incoming audio-frequency signal by said micro-computer;
   a first storage medium for storing a plurality of impulse scanning patterns;
   a second storage medium for selecting a specific impulse scanning pattern for the audio-frequency control system from said plurality of impulse scanning patterns and indicating a pattern-specific impulse sequence for the receiver station; and
   output means coupled to said micro-computer for controlling at least one control relay when said micro-computer determines that said received incoming signals have a pattern matching selected specific impulse scanning pattern and include a command control impulse sequence which matches said pattern-specific impulse sequence.

* * * * *